Figure 1D:
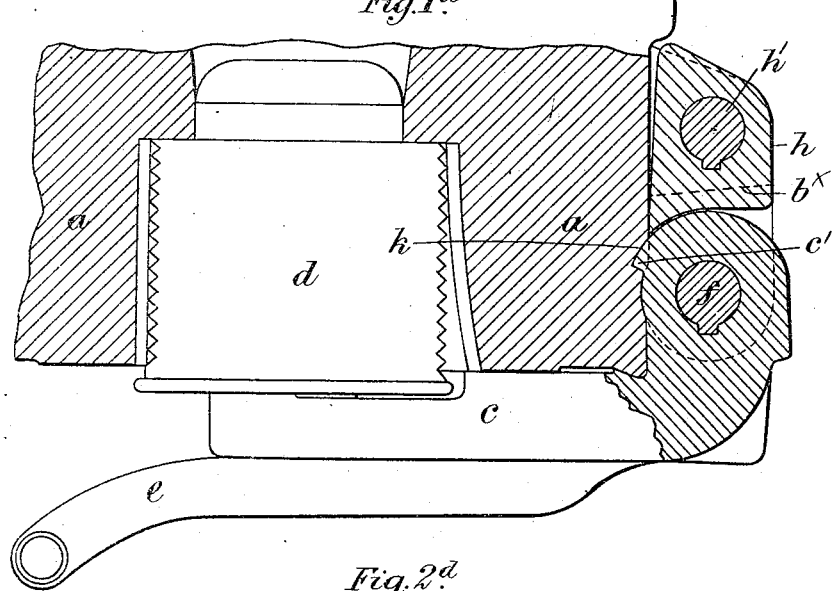
Figure 2D:
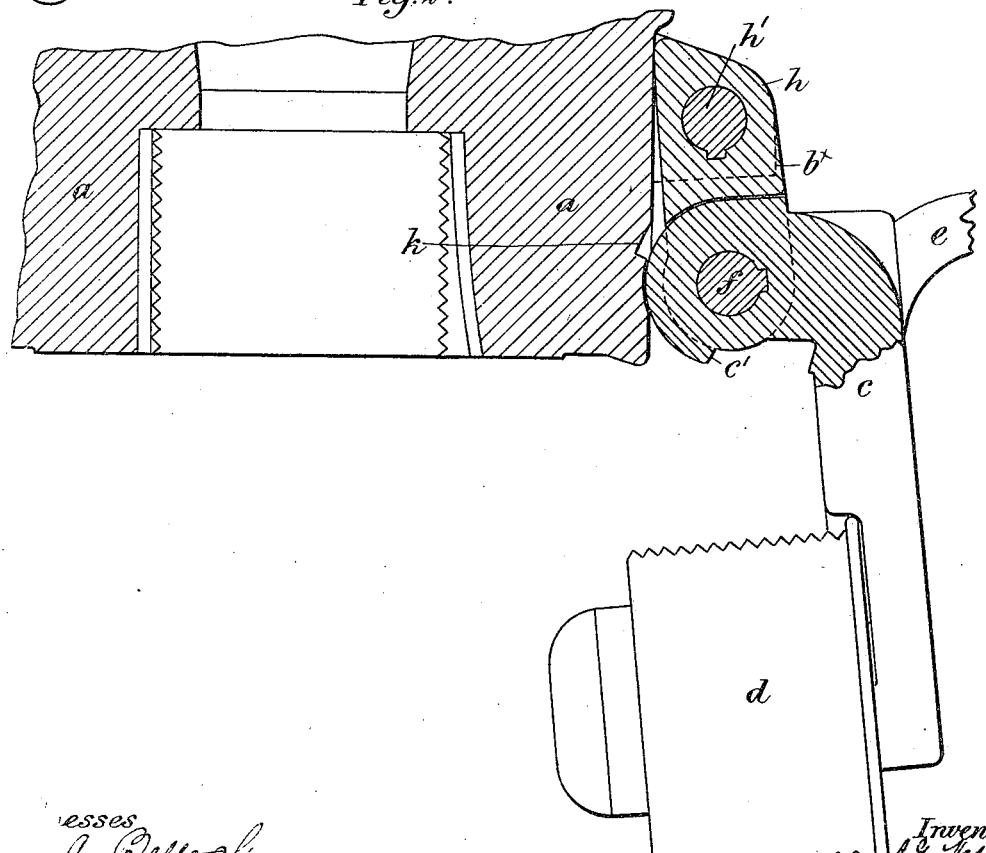

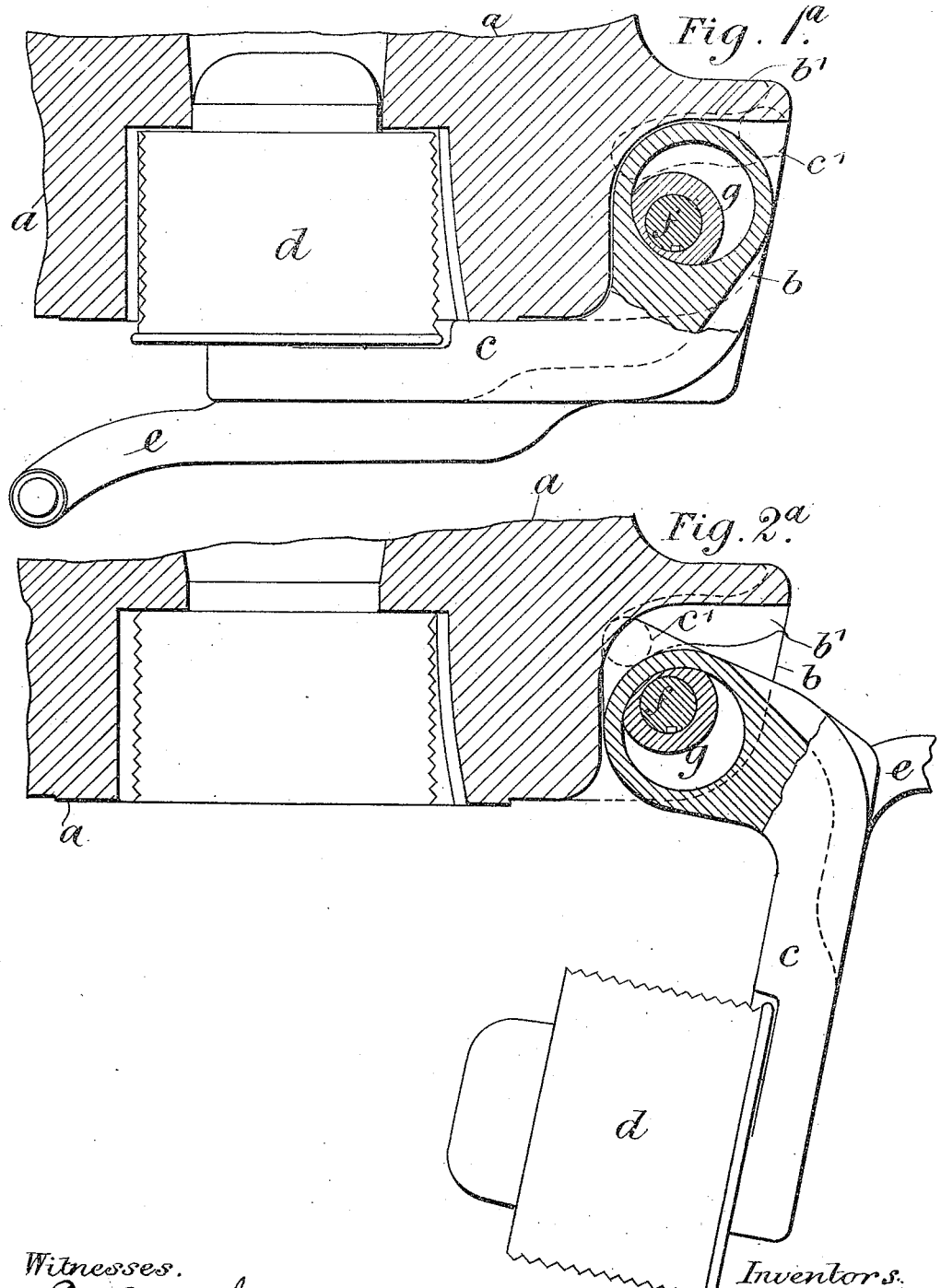

No. 634,238. Patented Oct. 3, 1899.
A. G. HADCOCK & S. M. MURRAY.
BREECH MECHANISM FOR GUNS.
(Application filed July 24, 1899.)
(No Model.) 14 Sheets—Sheet 2.
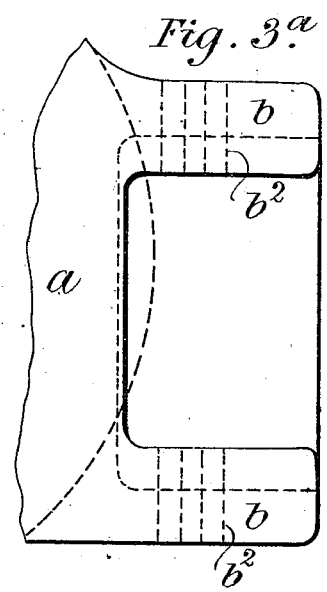
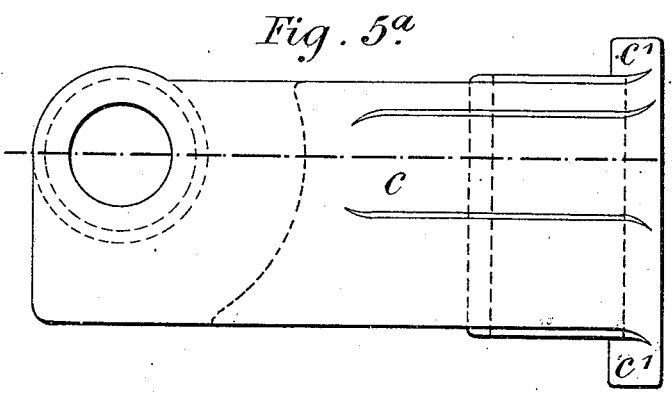
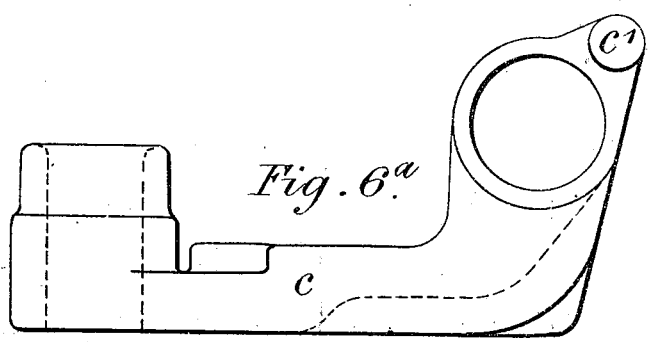
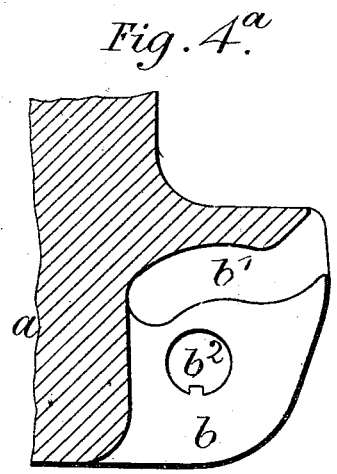
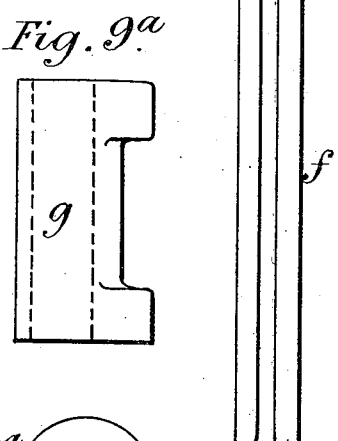
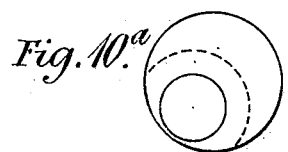

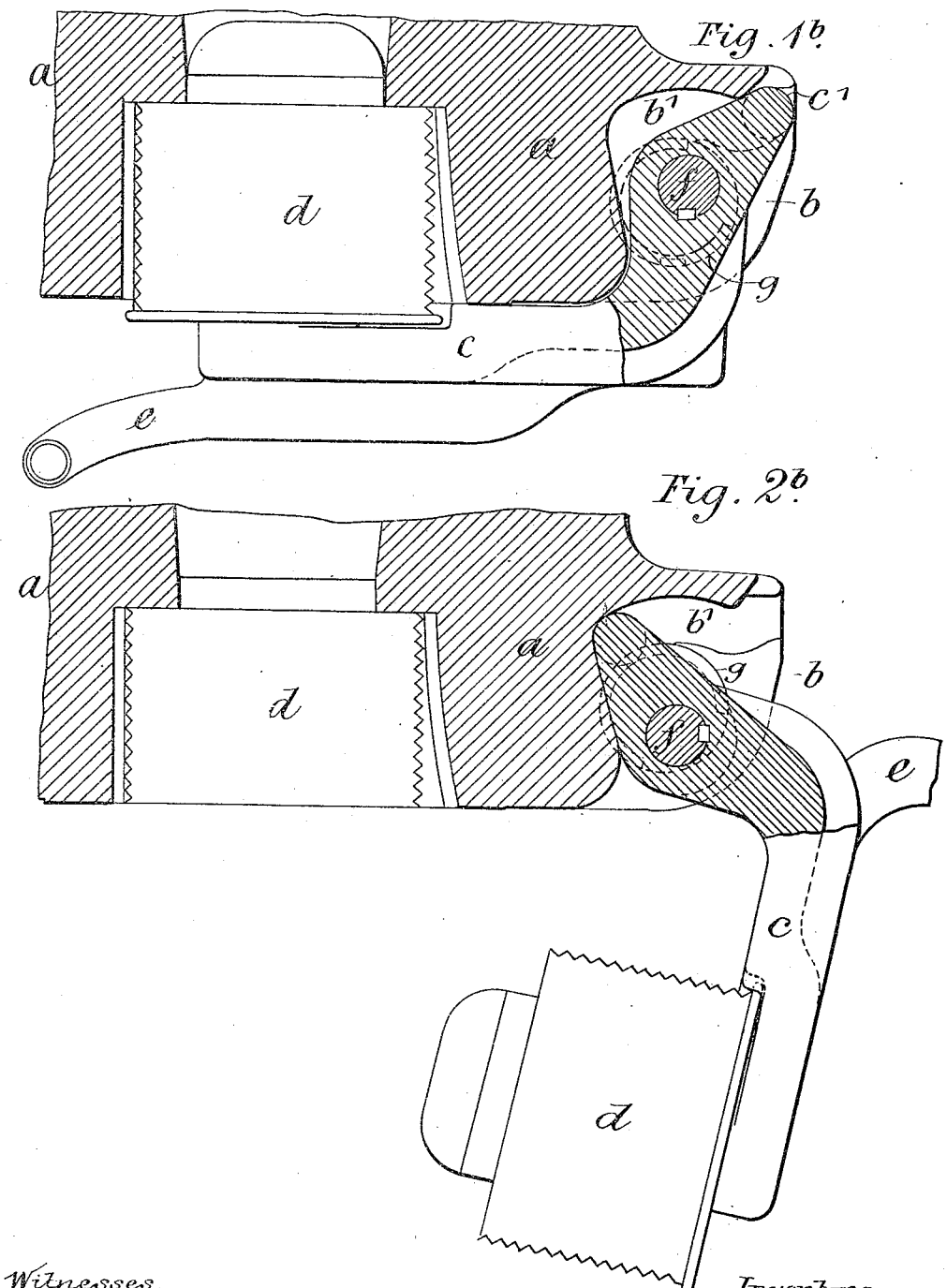

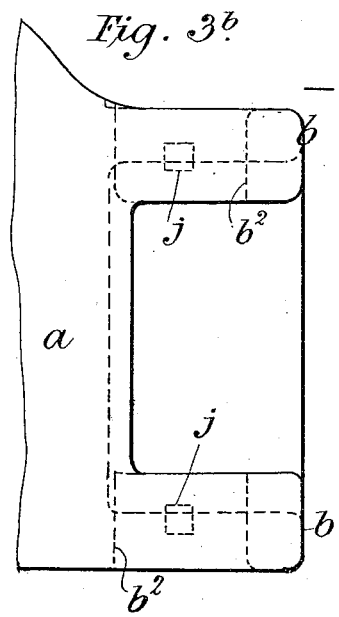
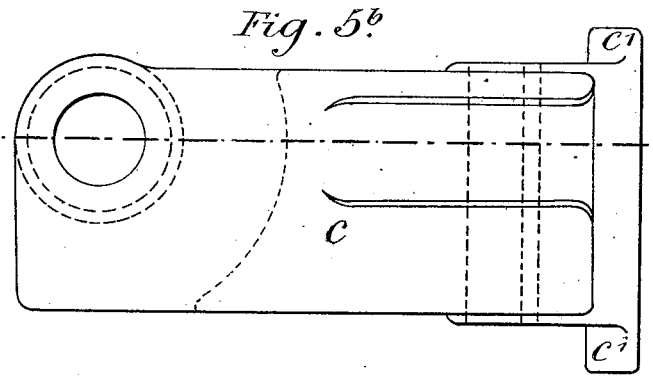
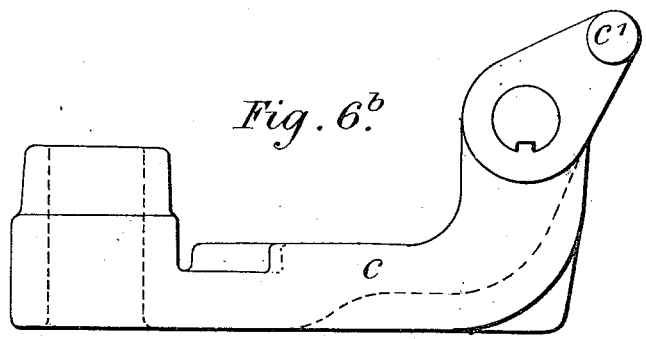
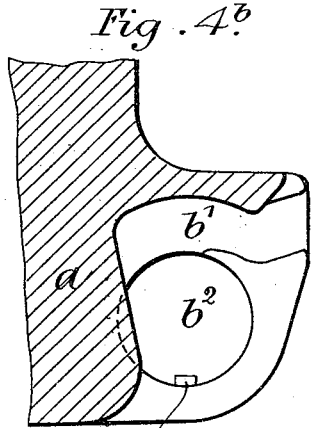
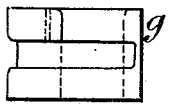
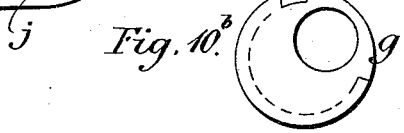

No. 634,238. Patented Oct. 3, 1899.
A. G. HADCOCK & S. M. MURRAY.
BREECH MECHANISM FOR GUNS.
(Application filed July 24, 1899.)
(No Model.) 14 Sheets—Sheet 5.
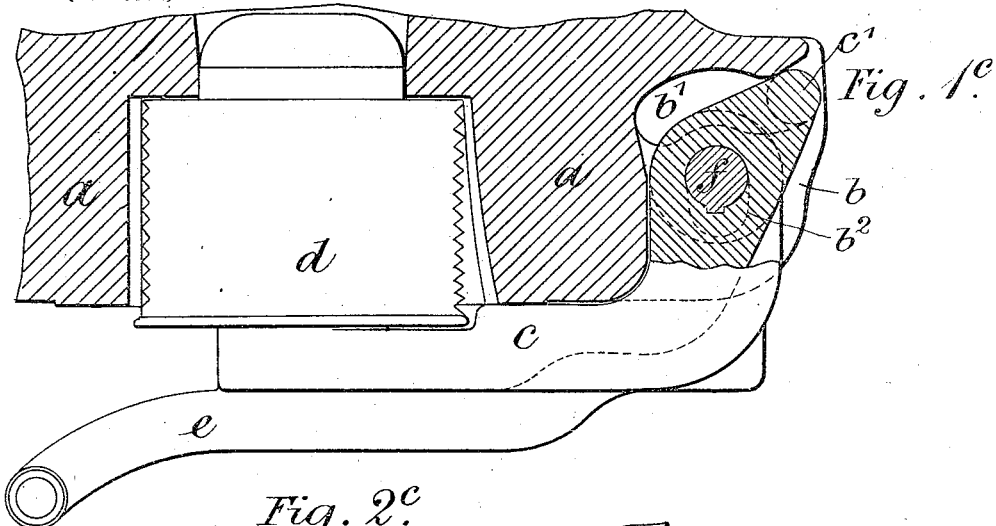
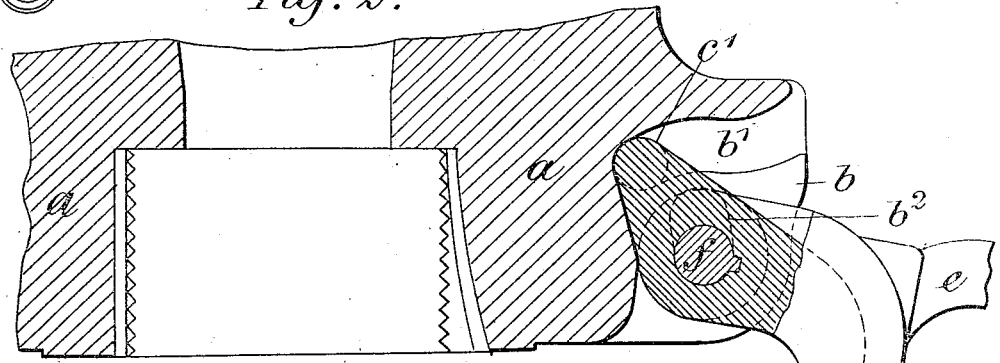
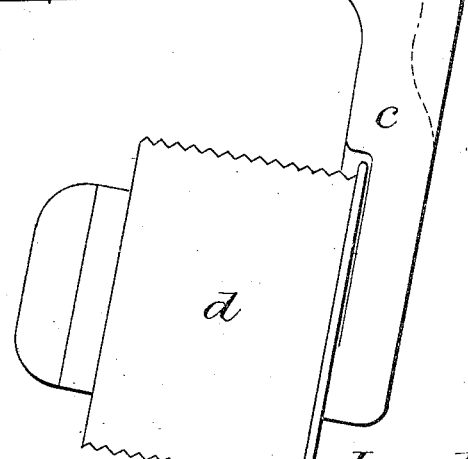
Witnesses.
E. A. Billoch.
A. M. Parkins.
Inventors.
A. G. Hadcock
S. M. Murray
By their Attorneys
Baldwin Davidson & Wright

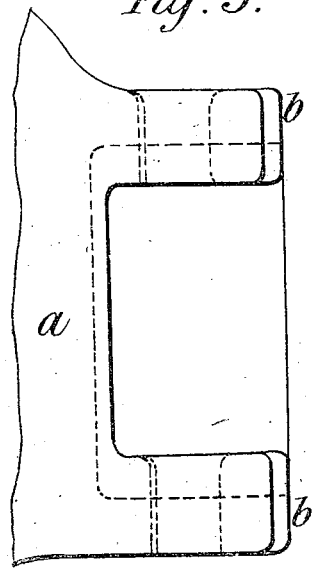
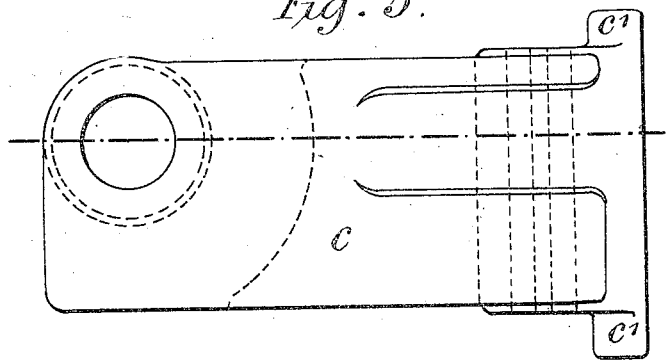
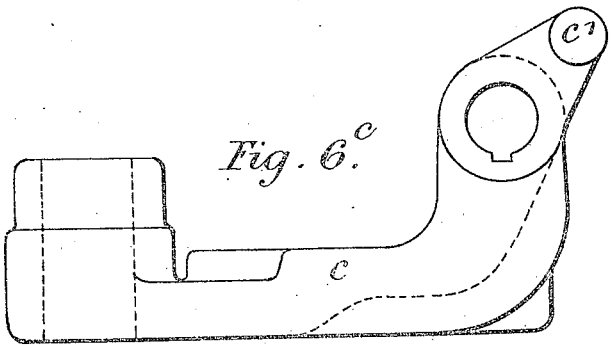
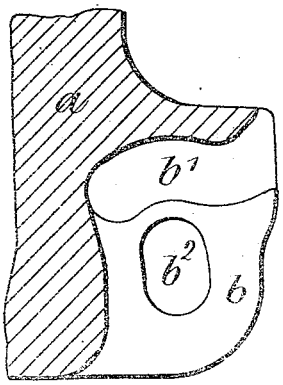

No. 634,238. Patented Oct. 3, 1899.
A. G. HADCOCK & S. M. MURRAY.
BREECH MECHANISM FOR GUNS.
(Application filed July 24, 1899.)
(No Model.) 14 Sheets—Sheet 7.

No. 634,238. Patented Oct. 3, 1899.
A. G. HADCOCK & S. M. MURRAY.
BREECH MECHANISM FOR GUNS.
(Application filed July 24, 1899.)
(No Model.) 14 Sheets—Sheet 8.
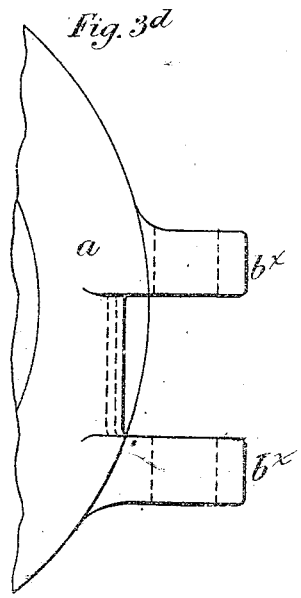
Fig. 3ᵈ
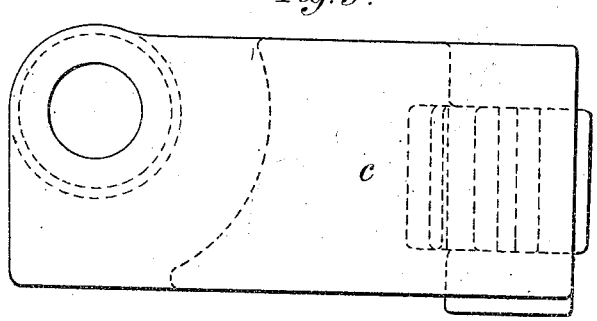
Fig. 5ᵈ
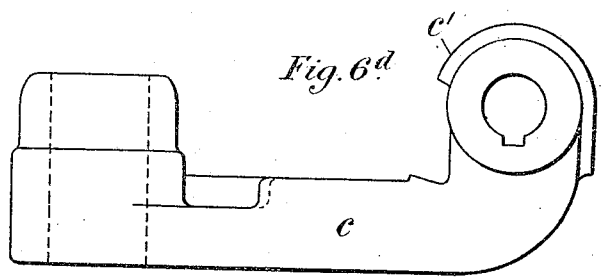
Fig. 6ᵈ
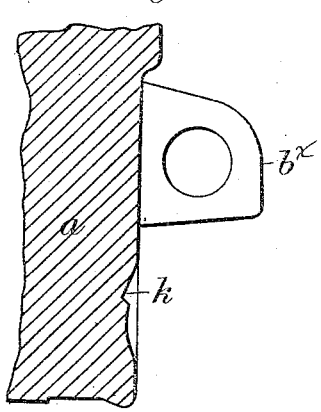
Fig. 4ᵈ
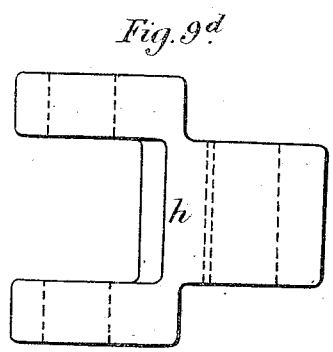
Fig. 9ᵈ
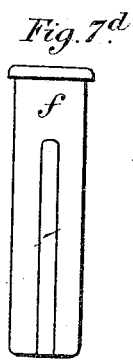
Fig. 7ᵈ
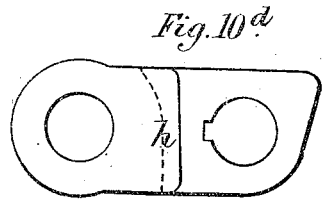
Fig. 10ᵈ
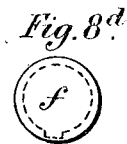
Fig. 8ᵈ
Witnesses
E. A. Bulloch
A. M. Parkins
Inventors
A. G. Hadcock
S. M. Murray
By their Attorneys
Baldwin Davidson & Wight

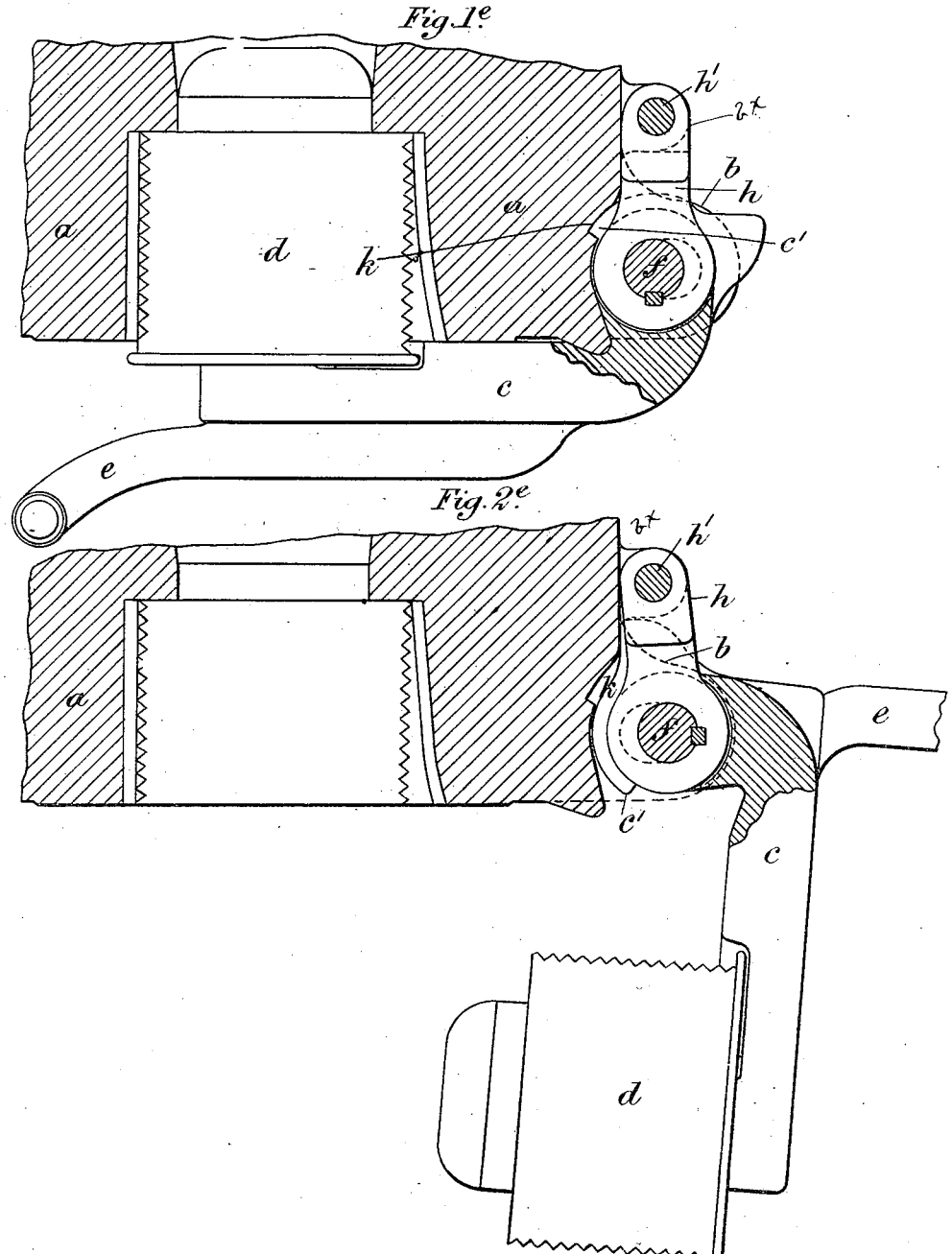

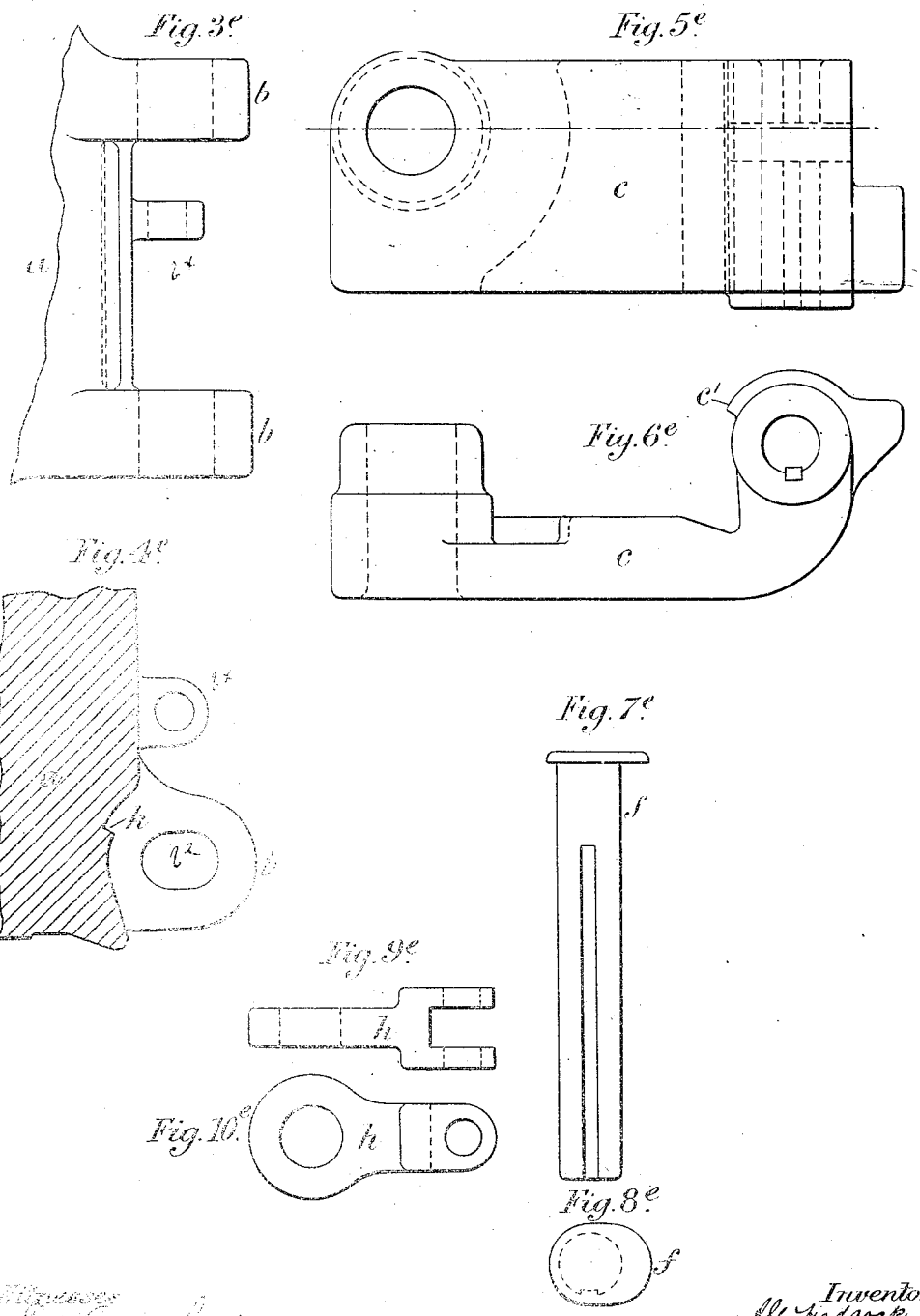

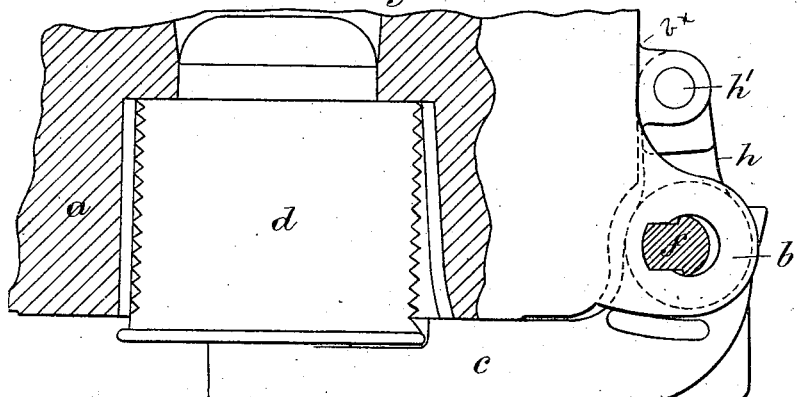
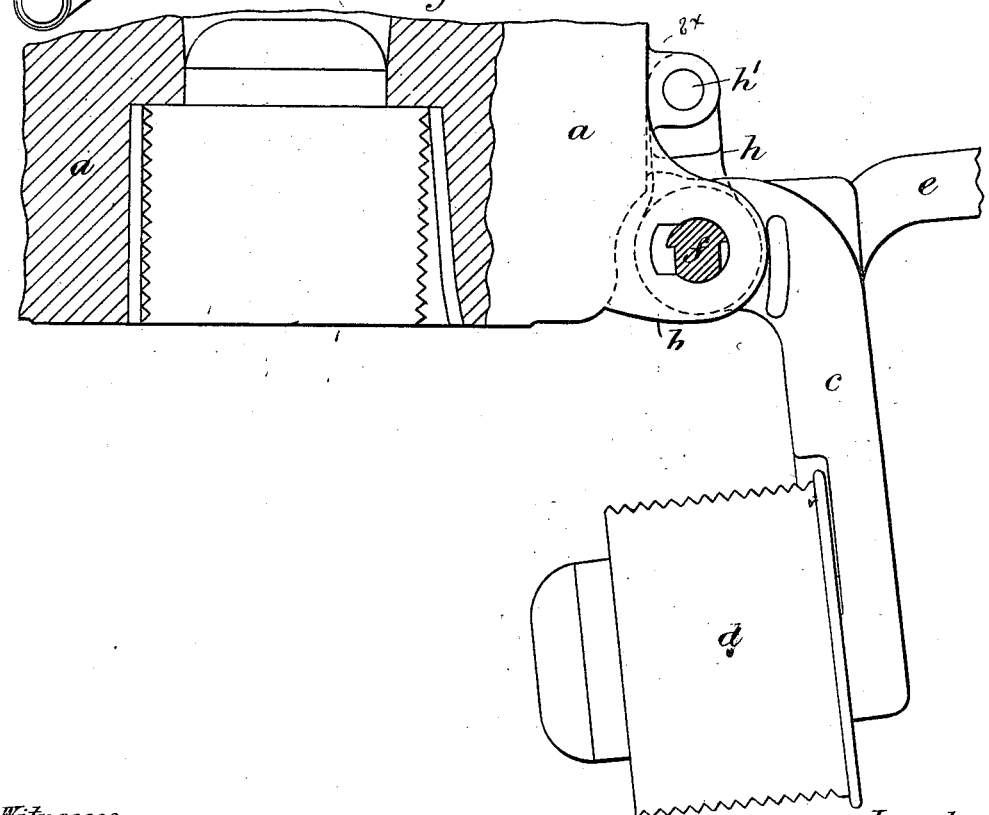

No. 634,238. Patented Oct. 3, 1899.
A. G. HADCOCK & S. M. MURRAY.
BREECH MECHANISM FOR GUNS.
(Application filed July 24, 1899.)
(No Model.) 14 Sheets—Sheet 12.
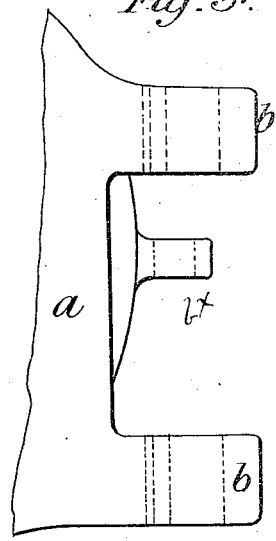
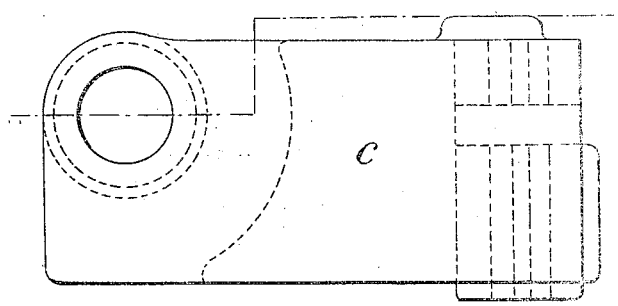
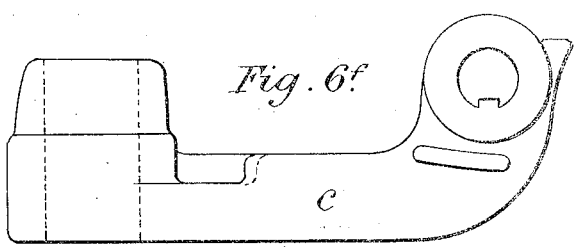
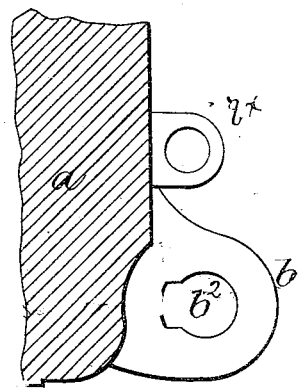
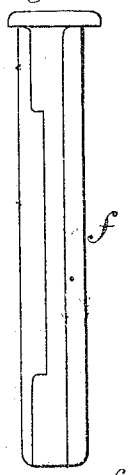
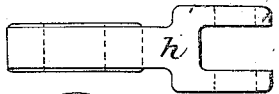
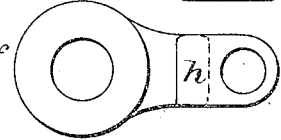

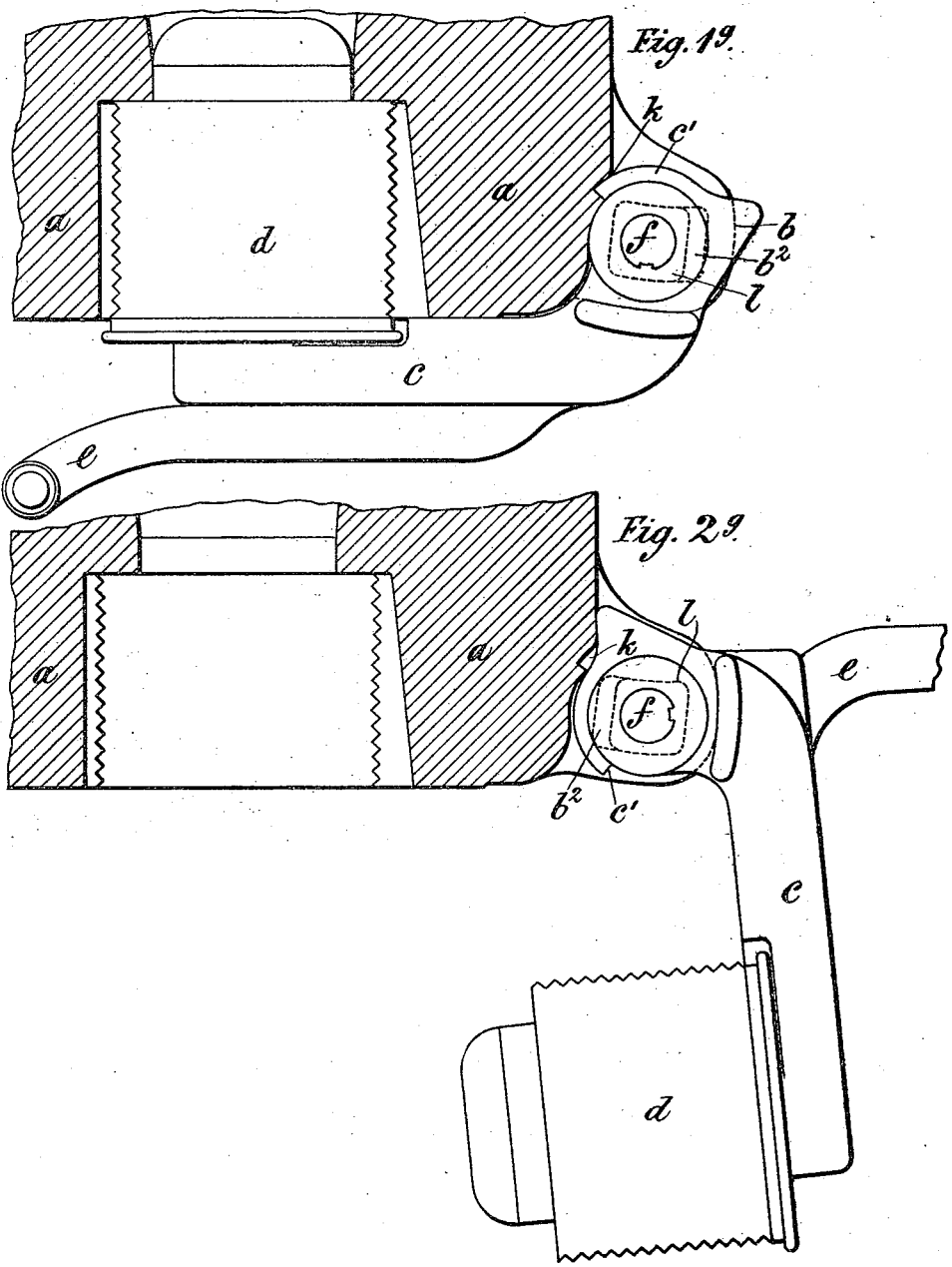

No. 634,238. Patented Oct. 3, 1899.
A. G. HADCOCK & S. M. MURRAY.
BREECH MECHANISM FOR GUNS.
(Application filed July 24, 1899.)
(No Model.) 14 Sheets—Sheet 14.
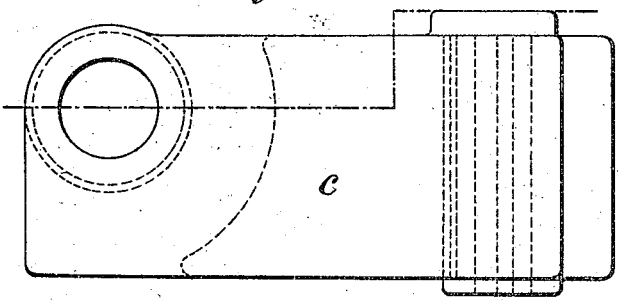
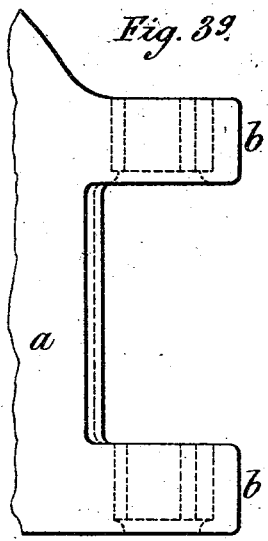
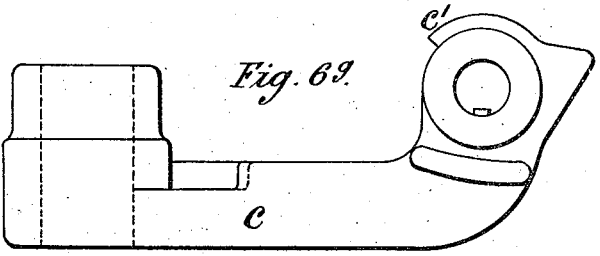
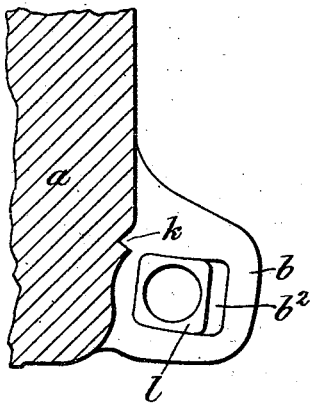
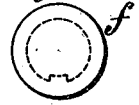

UNITED STATES PATENT OFFICE.

ALBERT GEORGE HADCOCK AND STEPHEN MAGUIRE MURRAY, OF NEW-CASTLE-UPON-TYNE, ENGLAND, ASSIGNORS TO THE SIR W. G. ARMSTRONG, WHITWORTH & COMPANY, LIMITED, OF SAME PLACE.

BREECH MECHANISM FOR GUNS.

SPECIFICATION forming part of Letters Patent No. 634,238, dated October 3, 1899.

Application filed July 24, 1899. Serial No. 724,944. (No model.)

*To all whom it may concern:*

Be it known that we, ALBERT GEORGE HADCOCK, late R. A., and STEPHEN MAGUIRE MURRAY, engineer, subjects of the Queen of Great Britain, residing at Elswick Works, Newcastle-upon-Tyne, England, have invented certain new and useful Improvements in the Breech Mechanism of Guns, of which the following is a specification.

This invention relates to the breech mechanism of quick-firing or other guns (especially those which have the De Bange or a kindred system of obturation) in which the divided breech-screw after being turned for unlocking is swung clear of the opening of the gun; and its object is to enable the angle of the obturator-pad and the amount of the material of the breech-screw and gun cut away in the interruption of the thread to be reduced to a minimum. For this purpose the axis about which the carrier-arm turns in place of being stationary, as is usual, shifts its position, the arm turning about one center at the commencement of its motion and about another center at the end.

The drawings show seven ways of carrying out the invention.

Figures $1^a$, $1^b$, $1^c$, $1^d$, $1^e$, $1^f$, and $1^g$ are longitudinal sections of the gun with the breech closed, and Figs. $2^a$, $2^b$, $2^c$, $2^d$, $2^e$, $2^f$, and $2^g$ are similar views with the breech open. Figs. $3^a$, $3^b$, $3^c$, $3^d$, $3^e$, $3^f$, and $3^g$ are rear elevations of the gun with the breech mechanism removed. Figs. $4^a$, $4^b$, $4^c$, $4^d$, $4^e$, $4^f$, and $4^g$ are horizontal sections of the rear of the gun with the breech mechanism removed. Figs. $5^a$, $5^b$, $5^c$, $5^d$, $5^e$, $5^f$, and $5^g$ are rear elevations of the carrier-arm $c$. Figs. $6^a$, $6^b$, $6^c$, $6^d$, $6^e$, $6^f$, and $6^g$ are plans of the carrier-arm $c$. Figs. $7^a$, $7^b$, $7^c$, $7^d$, $7^e$, $7^f$, and $7^g$ are elevations of the pin $f$. Figs. $8^a$, $8^b$, $8^c$, $8^d$, $8^e$, $8^f$, and $8^g$ are plans of the pin $f$. Figs. $9^a$ and $9^b$ and $10^a$ and $10^b$ are respectively elevations and plans of the eccentric block $g$. Figs. $9^d$, $9^e$, and $9^f$ and $10^d$, $10^e$, and $10^f$ are respectively elevations and plans of the second arm $h$.

$a$ is the gun, having fixed to it lugs $b$, between which the carrier-arm $c$ works.

$d$ is the breech-block pivoted to the carrier-arm.

$e$ is the handle pivoted to the carrier-arm by which the breech is opened and closed. The mechanism by which this is done forms no part of the present invention and is not shown in the drawings. It may be of any of the usual types.

$f$ is the pin forming the pivot of the carrier-arm.

In the arrangement shown at Figs. $1^a$ to $10^a$ the carrier-arm $c$ has fixed to it lugs $c'$, which work in grooves $b'$ in the lugs $b$ on the gun. The pin $f$ is fixed to the lugs $b$, fitting the holes $b^2$ in them. $g$ is an eccentric block on the pins $f$ and working in a hole in the arm $c$.

In Figs. $1^b$ to $10^b$ the carrier-arm $c$ has fixed to it lugs $c'$, which work in grooves $b'$ in the lugs $b$ on the gun, and the pin $f$ is fixed to the eccentrics $g$, which work in the holes $b^2$, being prevented from dropping out by pins $j$, projecting into grooves in them.

In Figs. $1^c$ to $8^c$ the carrier-arm $c$ has fixed to it lugs $c'$, which work in grooves $b'$ in the lugs $b$ on the gun; but the blocks $g$ are dispensed with, the pin $f$ being fixed to the carrier-arm $c$ and working in elongated slots $b^2$ in the lugs $b$.

In Figs. $1^d$ to $10^d$ the carrier-arm $c$ is pivoted to a second arm $h$, pivoted to lugs $b^\times$ on the gun, the carrier-arm during the first part of its motion turning about the forward pivot and afterward about the rearward one. The carrier-arm $c$ is at first prevented from turning about the pivot $f$ by the projection $c'$, which engages with a recess $k$ in the gun. The motion about the pivot $h'$ is limited by the tail end of the arm $h$ coming against the side of the gun. In this case the lugs $b$ on the gun, between which the carrier-arm works, are dispensed with.

Figs. $1^e$ to $10^e$ show an arrangement similar to that last described; but there is only a single lug $b^\times$, and the pin $f$ extends above and below the carrier-arm, its ends working in the elongated holes $b^2$ in the lugs $b$, and so limit the motion about the pivot $h'$.

Figs. $1^f$ to $10^f$ show an arrangement similar to that shown in Figs. $1^e$ to $10^e$; but in this case the projection $c'$ on the carrier-arm and the recess $k$ in the gun are dispensed with, the carrier-arm being prevented from turning about its pivot $f$ during the first part of its motion by the peculiar form of the pin $f$ and holes $b^2$.

Figs. $1^5$ to $8^5$ resemble the previous figures; but the arm $h$ is dispensed with, the pin $f$, working in blocks $g$, free to slide in the slots $b^2$ in the lugs $b$.

We claim—

1. The combination of a carrier-arm, a breech-block pivoted to it, a pivot about which the carrier-arm turns, and means for shifting the position of the pivot during the turning.

2. The combination of a carrier-arm, a breech-block pivoted to it, lugs on the gun between which the carrier-arm works, a pin connecting the carrier-arm to the lugs, and means for shifting the axis about which the carrier-arm turns.

3. The combination of a carrier-arm, a breech-block pivoted to it, lugs on the gun between which the carrier-arm works, cam-grooves in the lugs, projections on the carrier-arm working in the cam-grooves, and a pin connecting the carrier-arm to the lugs.

4. The combination of a carrier-arm, a breech-block pivoted to it, lugs on the gun between which the carrier-arm works, cam-grooves in the lugs, projections on the carrier-arm working in the cam-grooves, a pin fixed to the lugs, and an eccentric block on the pin working in holes in the carrier-arm.

ALBERT GEORGE HADCOCK.
STEPHEN MAGUIRE MURRAY.

Witnesses:
CHARLES RICHARD FOX ENGELBACH,
JNO. ELLIOTT WATSON.